Nov. 28, 1950 M. CAWEIN ET AL 2,531,399

TELEVISION PROJECTION SYSTEM AND VIEWING SCREEN

Filed April 27, 1946 2 Sheets-Sheet 1

INVENTORS
MADISON CAWEIN
HANS W. G. SALINGER

BY [signature]

ATTORNEY

TELEVISION PROJECTION SYSTEM AND VIEWING SCREEN

Filed April 27, 1946 2 Sheets-Sheet 2

INVENTORS
MADISON CAWEIN
HANS W. G. SALINGER

BY [signature]

ATTORNEY

Patented Nov. 28, 1950

2,531,399

UNITED STATES PATENT OFFICE 2,531,399

TELEVISION PROJECTION SYSTEM AND VIEWING SCREEN

Madison Cawein and Hans W. G. Salinger, Fort Wayne, Ind., assignors, by mesne assignments, to Farnsworth Research Corporation, a corporation of Indiana Application April 27, 1946, Serial No. 665,406

7 Claims. (Cl. 88—24)

This invention relates generally to optical systems and more particularly to a lens array arranged for projecting elemental areas of an image through transparent portions in an opaque viewing screen.

It has been suggested to provide an opaque or black viewing screen having a plurality of transparent portions for projecting a television image therethrough. A black viewing screen provided with an array of transparent portions has advantages over the conventional luminescent target or screen of a cathode ray tube arranged for reproducing television images. Even in the absence of a television image, a luminescent screen will not appear black but, on the contrary, bright and, therefore, the image contrast which may be obtained with such a luminescent screen is appreciably reduced. A black viewing screen, on the other hand, provides good contrast and, therefore, may be used with advantage in a television image reproducing system.

Such a black viewing screen requires a special lens system for projecting elemental areas of an object, which may be a television image, individually through the transparent portions of the screen. When the lens system is properly designed, the combined area of the transparent portions of the viewing screen is small compared to the total area of the screen. Accordingly, the viewing screen will normally appear black in the absence of light projected through the transparent screen portions. It is furthermore desirable to provide an optical system cooperating with such a black viewing screen which will permit an observer to view the image on the screen within a predetermined solid cone. Generally, the cross section of the solid cone within which the image may be viewed will be elliptical.

It is an object of the present invention, therefore, to provide a novel lens array, each lens of the array being arranged to focus an elemental area of an object in a predetermined plane in such a manner that the images of the elemental object areas are spaced from each other in the focal plane.

Another object of the invention is to provide a novel lens system for a black viewing screen having an array of transparent portions, the lens system being arranged to project elemental areas of the object individually through the transparent screen portions.

A further object of the invention is to provide a lens array cooperating with a black television viewing screen having a plurality of transparent portions through which a television image may be projected, the lens array being of such a character as to permit an observer to view the television image on the viewing screen within a predetermined solid cone.

In accordance with the present invention, there is provided an optical system comprising a first set of cylindrical lenses arranged parallel to each other and a second set of cylindrical lenses arranged parallel to each other and at right angles to the first set of lenses, thereby to provide an array of bicylindrical lenses.

For a better understanding of the invention, together with other and further objects thereof, reference is made to the following description, taken in connection with the accompanying drawings, and its scope will be pointed out in the appended claims.

Figure 1:
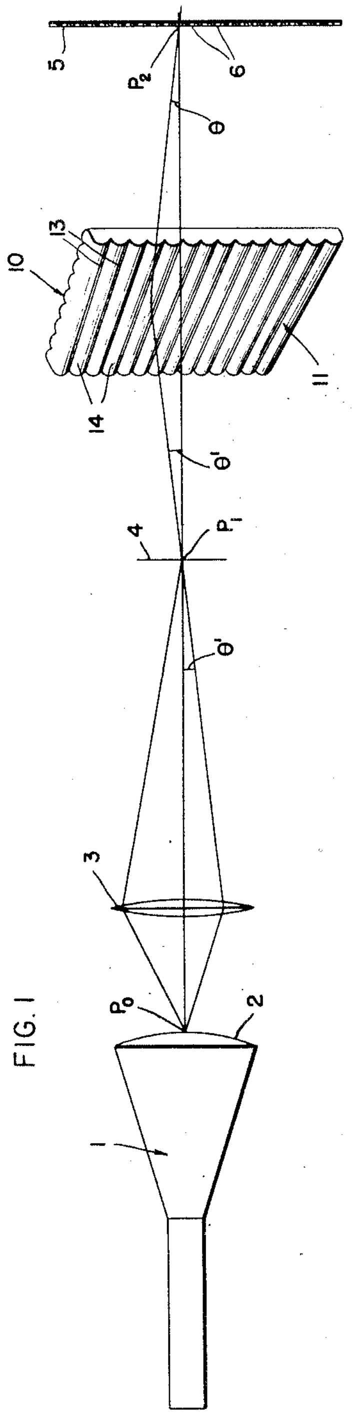
Fig. 1 is a schematic view of a television image projecting system including a bicylindrical lens array cooperating with a black viewing screen and embodying the present invention.

Referring to Fig. 1 of the drawings, there is illustrated a television image projecting system comprising cathode ray tube 1 arranged for reproducing television images. Cathode ray tube 1 is provided with luminescent target 2 for developing the television image by means of a cathode beam. By means of lens system 3 the television image developed on luminescent target 2 is focused in a plane indicated at 4 in such a manner that the object point $P_0$ on target 2 is imaged in plane 4 at the point $P_1$. The television image may be developed and projected by any conventional television image projector. It is not necessary to employ a refractive lens system such as indicated at 3 but instead a reflective optical system such as a Schmidt projector comprising a spherical mirror and a spherical aberration correcting plate may be utilized.

The television image focused in plane 4 is projected through black viewing screen 5 provided with a plurality of transparent portions indicated at 6 which form an array. The advantages of a black viewing screen over a conventional luminescent target, such as 2, have already been pointed out. As will be shown in detail hereinafter the combined area of transparent portions 6 is small compared to the total area of viewing screen 5 so that the screen appears black in the absence of light projected through transparent portions 6.

Figure 2:
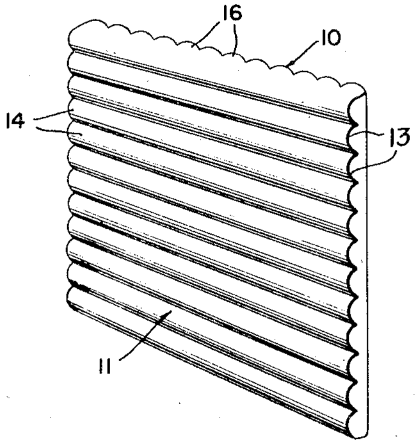
Fig. 2 is a front view in perspective of the bicylindrical lens array of Fig. 1.
Figure 3:
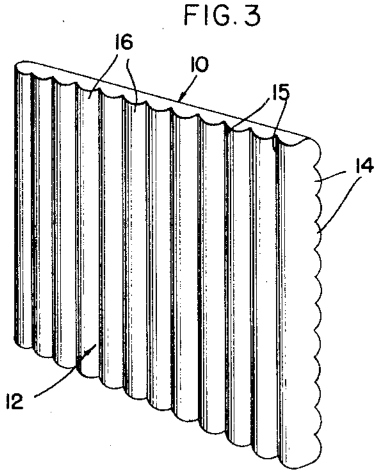
Fig. 3 is a rear view in perspective of the bicylindrical lens array.

For the purpose of projecting elemental areas of the image focused in plane 4 through transparent portions 6, there is provided, in accordance with the present invention, bicylindrical lens system or array 10 illustrated particularly in Figs. 2 and 3. The image focused in plane 4 becomes the object of lens system 10 and may be termed the intermediate image. Lens system 10 comprises surface 11 facing the image developed on target 2 which is the object of lens system 10, and surface 12 facing black viewing screen 5. Surface 11 is provided with a series of parallel equidistant grooves 13 forming cylindrical lenses 14 while surface 12 has a series of parallel equidistant grooves 15 forming cylindrical lenses 16. Preferably lenses 14 and 16 form two surfaces of a transparent optical medium which fills the space between the two sets of lenses. Cylindrical lenses 14 are arranged at right angles to cylindrical lenses 16 so that the two sets of cylindrical lenses 14 and 16 form an array of bicylindrical lenses which is aligned with transparent portions 6 in black viewing screen 5. Intermediate image point $P_1$ in plane 4 is imaged by lens system 10 in point $P_2$ in viewing screen 5. Bicylindrical lens array 10 should be designed so that each elemental area of the intermediate image focused in plane 4 is projected through one of the transparent portions 6. Furthermore, an observer standing to the right of viewing screen 5, as seen in Fig. 1, should be able to see the television image within a predetermined solid cone.

Lens system 10 may be calculated, by way of example, for certain conditions. The following calculations may best be carried out by utilizing Hamilton's characteristic function or eikonal. The characteristic function is the optical length of the light path from an object point to the image point through optical media of different refractive indices, the optical length being given as a function of the coordinates of object point and image point. The characteristic function must be a minimum. Furthermore, in order to image an object point in an image point all possible light paths between the two points must be equal in optical length.

Figure 4:
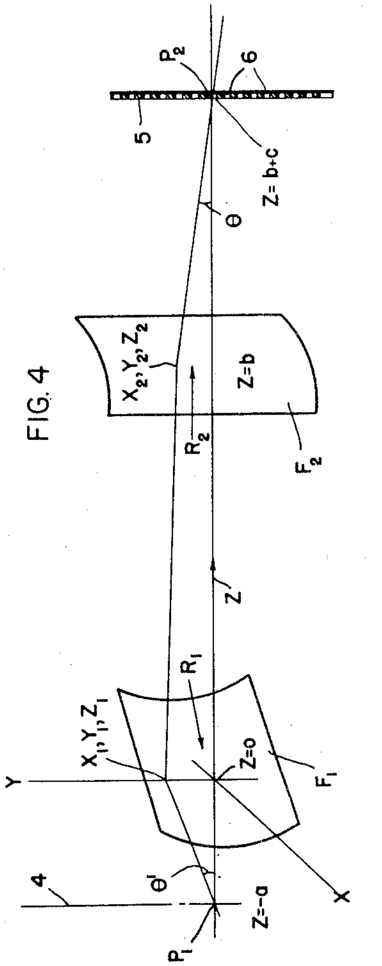
Fig. 4 is a schematic view of a light path through the lens system of the invention.

Referring now to Fig. 4, there is illustrated the path of a light ray between the points $P_1$ in plane 4 and $P_2$ in screen 5 which have already been referred to in connection with Fig. 1. The $z$-axis is taken along the light path and the axes $x$ and $y$ pass through the point $z=0$ which is intersected by surface $F_1$ corresponding to surface 11 of lens system 10. Surface $F_2$ corresponds to surface 12 of the lens system.

A light ray coming from the edge of lens 3 (Fig. 1) makes an angle $\theta'$ with the $z$-axis as shown in Figs. 1 and 4. If we assume that lens 3 has a 6″ diameter and that an image is focused at $P_1$, that is, in plane 4, 3½ feet in front of lens 3, $$\tan \theta' = \frac{3}{42} = \frac{1}{14}$$

The rays emerging at $P_2$, that is, through one of the transparent portions 6 in viewing screen 5 will also form angles $\theta$ with the $z$-axis. All angles $\theta$ must be within a certain solid cone which generally will have an elliptical cross section. It will be shown hereinafter that this solid cone is wider in the direction of the axes of cylinders $F_1$ facing target 2 than in that of the axes of cylinders $F_2$ facing viewing screen 5. Accordingly, the cross section of the solid cone has the shape of a flat ellipse.

We will now assume that an observer stands at a distance of six feet in front of viewing screen 5, that is, to the right of screen 5 as seen in Figs. 1 and 4, and that he should be able to view the image on screen 5 if he moves two feet to the right or left and one foot up or down. Accordingly, $\tan \theta_h = 1/3$ while $\tan \theta_v = 1/6$, where $\theta_h$ is the angle in the $xz$ plane and $\theta_v$ the angle in the $yz$ plane. The rays may have a crossover inside lens system 10, and therefore not $\theta_h$ and $\theta_v$ but their absolute values $|\theta_h|$ and $|\theta_v|$ are given by the above equations.

With the above assumptions, the area of transparent portions 6 in screen 5 is determined. According to the law of Lagrange and Helmholtz, the product of the lateral dimensions of an object and the tan $\theta$ has the same value as the corresponding product for the image. Hence the individual lenses 14, 16 will form images in the plane through $P_2$, that is, in the plane of screen 5 which occupy only $$\frac{\tan \theta'^2}{\tan \theta_h \tan \theta_v} = \frac{3\times 6}{14^2} = .092$$

or 9.2 per cent of the total area of screen 5. Hence, viewing screen 5 will be 90.8 per cent opaque.

The characteristic function V is the optical length of a ray from the object or intermediate image point $P_1$ to the image point $P_2$. Employing the notations of Fig. 4 we obtain:

(1)

$$V = \sqrt{x_1^2 + y_1^2 + (z_1 + a)^2} + n\sqrt{(x_2 - x_1)^2 + (y_2 - y_1)^2 + (z_2 - z_1)^2} + \sqrt{x_2^2 + y_2^2 + (b + c - z_2)^2}$$

where $n$ is the refractive index of lens system 10. For actual rays, V must be a minimum; hence, the coordinates of the points $x_1$, $y_1$, $z_1$, and $x_2$, $y_2$, $z_2$, where the light ray enters and leaves lens system 10 are given by the following six differential equations:

(2)

$$\frac{dV}{dx_1} + u_1\frac{dF_1}{dx^1} = 0 \qquad \frac{dV}{dx_2} + u_2\frac{dF_2}{dx_2} = 0$$

$$\frac{dV}{dy_1} + u_1\frac{dF_1}{dy_1} = 0 \qquad \frac{dV}{dy_2} + u_2\frac{dF_2}{dy_2} = 0$$

$$\frac{dV}{dz_1} + u_1\frac{dF_1}{dz_1} = 0 \qquad \frac{dV}{dz_2} + u_2\frac{dF_2}{dz_2} = 0$$

where $u_1$, and $u_2$ are parameters usually called Lagrangian factors.

Equations 1 and 2 may be solved, for example, by developing Equation 1 and retaining only terms up to the second order. In a similar manner, $F_1=0$, $F_2=0$ may be developed. To this end, we regard $a$, $b$ and $c$ shown in Fig. 4 as finite quantities while $x_1$, $y_1$, $z_1$, $x_2$, $y_2$, $(z_2-b)$ are taken to be small of the first order. Equation 1 may accordingly be developed as follows:

(3)

$$V = nb + a + c + (n-1)(z_2 - z_1 - b) + \frac{x_1^2 + y_1^2}{2a} + n\frac{(y_2 - y_1)^2 + (x_2 - x_1)^2}{2b} + \frac{x_2^2 + y_2^2}{2c}$$

The equations for $F_1=0$, $F_2=0$ are with the same degree of approximation as follows:

(4) $F_1=y_1^2-2R_1z_1=0 \qquad F_2=x_2^2+2R_2(z_2-b)=0$ wherein $R_1$ and $R_2$ are the radii of curvature of lenses 14 and 16, respectively.

By substituting Equations 3 and 4 into Equations 2 we obtain:

$$\frac{dV}{dx_1}+u_1\frac{dF_1}{dx_1}=\frac{x_1}{a}-\frac{n}{b}(x_2-x_1)=0$$

$$\frac{dV}{dx_2}+u_2\frac{dF_2}{dx_2}=\frac{n}{b}(x_2-x_1)+\frac{x_2}{c}+2u_2x_2=0$$

$$\frac{dV}{dy_1}+u_1\frac{dF_1}{dy_1}=\frac{y_1}{a}-\frac{n}{b}(y_2-y_1)+2u_1y_1=0$$

$$\frac{dV}{dy_2}+u_2\frac{dF_2}{dy_2}=\frac{n}{b}(y_2-y_1)+\frac{y_2}{c}=0$$

$$\frac{dV}{dz_1}+u_1\frac{dF_1}{dz_1}=-(n-1)-u_12R_1=0$$

$$\frac{dV}{dz_2}+u_2\frac{dF_2}{dz_2}=(n-1)+u_22R_2=0$$

From the above 6 equations, $u_1$ and $u_2$ (the Lagrangian factors) may be eliminated and we obtain the following two sets of equations:

(5)

$$x_1\left(\frac{1}{a}+\frac{n}{b}\right)-\frac{n}{b}x_2=0 \qquad \frac{-n}{b}x_1+\left(\frac{n}{b}+\frac{1}{c}-\frac{n-1}{R_2}\right)x_2=0$$

$$y_1\left(\frac{1}{a}+\frac{n}{b}-\frac{n-1}{R_1}\right)-\frac{n}{b}y_2=0 \qquad \frac{-n}{b}y_1+\left(\frac{n}{b}+\frac{1}{c}\right)y_2=0$$

Generally $x_1=x_2=0$ and $y_1=y_2=0$ are the only solutions of Equations 5. This means that only a ray along the $z$-axis passes through $z=-a$ and $z=b+c$. However, if the determinants of Equations 5 vanish, an infinity of other solutions exists. This obviously is the condition for the point $P_1$ or $z=-a$ to be imaged to the point $P_2$ or $z=b+c$. Accordingly, Equations 5 are also satisfied for the following conditions:

(6)

$$\left(\frac{1}{a}+\frac{n}{b}\right)\left(\frac{1}{c}+\frac{n}{b}-\frac{n-1}{R_2}\right)=\frac{n^2}{b^2}$$

$$\left(\frac{1}{c}+\frac{n}{b}\right)\left(\frac{1}{a}+\frac{n}{b}-\frac{n-1}{R_1}\right)=\frac{n^2}{b^2}$$

If Equations 6 are satisfied, the ratios $$\frac{x_1}{x_2} \quad \text{and} \quad \frac{y_1}{y_2}$$

are given as follows:

(7) $$\frac{x_1}{x_2}=\frac{n/b}{1/a+n/b} \qquad \frac{y_1}{y_2}=\frac{n/b+1/c}{n/b}$$

From Equations 6 the ratio $$\frac{R_1}{R_2}$$

may also be obtained as follows:

$$\frac{1}{R_2}\left(\frac{1}{a}+\frac{n}{b}\right)=\frac{1}{R_1}\left(\frac{1}{c}+\frac{n}{b}\right)$$

or (8) $$\frac{R_1}{R_2}=\frac{1/c+n/b}{1/a+n/b}=\frac{a}{c}\,\frac{b+nc}{b+na}=\frac{b/nc+1}{b/na+1}$$

The above equations determine all dimensions of lens system 10 provided $n$, the refractive index of the optical medium of lens system 10 is given. We may assume that lens system 10 consists of Lucite having a refractive index $n=1.5$. It is to be understood, however, that lens system 10 may consist of any other suitable optical medium.

It may be seen from Fig. 4 that $$\tan\theta'=\frac{x_1}{a}=\frac{y_1}{a}$$

For a limiting ray, that is, for a ray which still impinges on the edge of the same lens corresponding to surface $F_1$, $x_1$ must be equal to one-half the distance between grooves 13. We may assume a lens system 10 having the dimensions of 12" x 16" and further that 500 television image lines should be discernible. Accordingly, lens system 10 should have 1000 grooves 13 so that $x_1=.006''=6$ mils. $y_1$ preferably is equal to $x_1$ and accordingly, there are also 1000 grooves 15. These assumptions now determine the value of $a$, which may be calculated as follows:

$$\tan\theta'=\frac{1}{14}=\frac{x_1}{a}=\frac{6}{a},\ a=84 \text{ mils}$$

So far it has been assumed that $a>0$ which corresponds to the condition illustrated in Fig. 4, that is, plane 4, the intermediate image plane, is to the left of the $xy$ plane. However, it is also possible that $a<0$. In that case, $P_1$ is at the point $z=+a$ so that $P_1$ is located to the right of surface $F_1$ and becomes virtual.

Two special incoming light rays will now be considered. One of the rays is in the $yz$ plane and intersects surface $F_1$ at a point $y_1>0$. The other one of the rays is in the $xz$ plane and intersects surface $F_1$ at a point $x_1>0$. If $a<0$, it is evident that $\tan\theta'$ becomes negative and the value to be chosen for $a$ is $-84$ mils. Corresponding to these special incoming rays, there will be two rays emerging from surface $F_2$. It is obvious that $c$ must always be positive because otherwise viewing screen 5 would be located to the left of surface $F_2$ which is obviously not possible. Therefore, it follows from the last Equation 7 that $y_2>0$ because $y_1>0$.

Corresponding to the two emerging ways we introduce:

(9) $$\tan\theta_x=\frac{x_2}{c},\ \tan\theta_y=\frac{y_2}{c}>0$$

If we now introduce:

(10) $$\frac{\tan\theta_x}{\tan\theta'}=w_x \quad \text{and} \quad \frac{\tan\theta_y}{\tan\theta'}=w_y$$

Equation 7 may be rewritten as follows:

(11) $$\frac{x_2}{x_1}=w_x\frac{c}{a}=\frac{b}{na}+1 \quad \text{or} \quad w_xc-\frac{b}{n}=a$$

$$\frac{y_1}{y_2}=\frac{1}{w_y}\frac{a}{c}=\frac{b}{nc}+1 \quad \text{or} \quad w_yc+\frac{w_yb}{n}=a$$

with the following solutions:

(12) $$c=a\frac{w_y+1}{w_y(w_x+1)},\ \frac{b}{n}=a\frac{w_x-w_y}{w_y(w_x+1)}$$

$w_x$ and $w_y$ are not directly known but we know that one of the quantities $$|w_x| \quad \text{and} \quad |w_y| \quad \text{is} \quad \frac{14}{3}$$

and the other one is $$\frac{14}{6}$$

As both $$\frac{14}{3} \quad \text{and} \quad \frac{14}{6}$$

are larger than 1, it follows that $w_x+1$ and $w_y+1$ have the signs of $w_x$ and $w_y$, respectively As c and $$\frac{b}{n}$$

are both positive, it may be concluded from the first of Equations 12 that $a$ has the same sign as $w_x$, while the last of Equations 11 shows that $a$ and $w_y$ have the same sign. From the second Equation 12 it then follows that $a$ and $(w_x-w_y)$ also have the same sign. This leaves only two possibilities $$a>0,\ w_x>w_y>0 \text{ and } a<0,\ w_x<w_y<0$$

We, therefore, find that $|w_x|>|w_y|$. On the other hand, the larger one of the two values for $|w_x|$ and $|w_y|$, that is, $$\frac{14}{3}$$

belongs to the horizontal direction. Therefore, the $x$-axis, that is, the direction of grooves 13 facing target 2 has to be horizontal as illustrated in Figs. 1 and 4. Since we have assumed that $n=1.5$, it follows that either $a=84$ mils, $$w_x=\frac{14}{3},\ w_y=\frac{14}{6}$$

and, therefore, $c=21.2$ mils and $b=22.2$ mils or that $a=-84$ mils, $$w_x=-\frac{14}{3},\ w_y=-\frac{14}{6}$$

and, therefore, $c=13.1$ mils and $b=34.4$ mils. The values for $c$ and $b$ are given by Equations 12.

It will also be seen that it is impossible to assume $w_x=w_y$ because the last Equation 12 is then only satisfied when $b=0$ so that lens system 10 vanishes.

From Equations 6, $R_1$ and $R_2$, that is, the radii of curvature of lenses 14 and 16 may now be determined because all other quantities in Equations 6 are known. Equations 6 may be rewritten as follows:

$$\left(\frac{b}{na}+1\right)\left(b+1-\frac{n-1}{R_2}\frac{b}{n}\right)=1$$

and $$\left(\frac{b}{nc}+1\right)\left(\frac{b}{na}+1-\frac{n-1}{R_1}\frac{b}{n}\right)=1$$

This may be transformed into:

$$\text{(6a)}\quad R_1=(n-1)\frac{a}{1+w_y}\qquad R_2=(n-1)\frac{aw_x}{w_y}\left(\frac{1+w_y}{1+w_x}\right)^2$$

Figure 5:
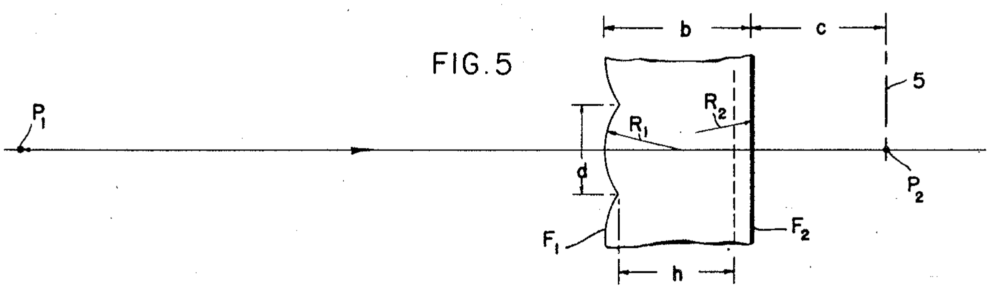
Fig. 5 is a view on enlarged scale of one embodiment of a bicylindrical lens array which may be employed in the projecting system of Fig. 1.
Figure 6:
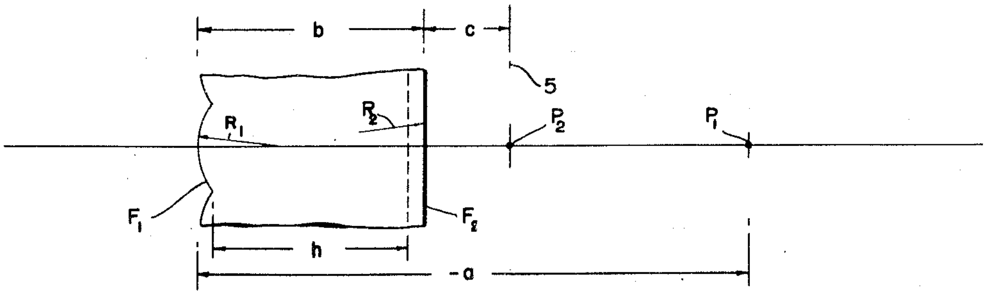
Fig. 6 is a view on enlarged scale of a preferred embodiment of the bicylindrical lens array in accordance with the invention.

Accordingly, we obtain two sets of values for $R_1$ and $R_2$ from Equations 6$a$ corresponding to the two values for $a$, $w_x$ and $w_y$. The dimensions of the two lens system which follow from the above equations are given in the following table:

| | Lens System of Fig. 5 | Lens System of Fig. 6 |
|---|---|---|
| $a$ ............ mils | 84 | −84 |
| $b$ ............ do | 22.2 | 34.4 |
| $c$ ............ do | 21.2 | 13.1 |
| $R_1$ ............ do | 12.6 | 31.5 |
| $R_2$ ............ do | 8.74 | 8.33 |
| $d$ ............ do | 12 | 12 |
| $w_x$ | $\frac{14}{3}$ | $\frac{-14}{3}$ |
| $w_y$ | $\frac{14}{6}$ | $\frac{-14}{6}$ |
| $h$ ............ mils | 18.3 | 31.3 |
| $n$ | 1.5 | 1.5 |

It will be seen that for both lens systems $R_1$ as well as $R_2$ are positive which means that lenses 14 and 16 are both convex which has already been assumed in Equations 4. $h$, which is also given in the above table, is the thickness of lens system 10 where it is smallest. $d$, as shown in Figs. 5 and 6 is the height or width of one of lenses 14 or 16. A section of the lens system obtained with the figures shown on the left hand side of the above table is illustrated in Fig. 5 and a section of the lens system obtained with the values on the right hand side of the table is shown in Fig. 6. It will be obvious from an inspection of Fig. 6 that $P_1$, the point in which the intermediate image is focused, is to the right of viewing screen 5, that is, the image is focused by lens 3 in a virtual plane. The sections of the lens system illustrated in Figs. 5 and 6 are approximately to scale. The lens system shown in Fig. 6 is preferred because $b$, the thickness of the lens system, is larger.

The two sets of cylindrical lenses 14 and 16 divide optical system 10 into a checkerboard pattern of squares 12 x 12 mils in area. The image projected by lens 3 in plane 4 may also be thought of as being subdivided into such squares or elemental areas. Optical system 10 focuses these elemental areas individually onto viewing screen 5 where they appear substantially as rectangles, each having a horizontal side of $3/14\times12=2.57$ mils and a vertical side of $6/14\times12=5.14$ mils. Thus, viewing screen 5 will have a transparent area 2.57 x 5.14 mils in the center of each 12 x 12 mils opaque square.

By considering the conditions for an intermediate image point $P_1$ above or below the $z$-axis, it is found that the array of transparent portions 6 in viewing screen 5 will have a pincushion outline. Therefore, it is preferred to prepare viewing screen 5 by a photographic method. To this end, light of uniform intensity may be projected by lens 3 through lens system 10 and focused in the plane of screen 5. In the plane of screen 5 a photographic plate or film is now arranged which is exposed to the uniform light and then developed to obtain a negative image. Then a positive screen is prepared of the photographic plate which will have transparent portions 6 where the light is focused by lens system 10 in the plane of screen 5. Now the positive screen or viewing screen 5 may be arranged in the plane of point $P_2$ in the same position which the photographic plate occupied when it was exposed to the light so that the transparent portions 6 are aligned with lenses 14 and 16 of optical system 10. In this manner the outline of each transparent portion 6 will exactly correspond to the images of each elemental area which are focused in the plane of screen 5.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An optical system for projecting an image comprising means for focusing said image in a plane, an opaque viewing screen arranged for viewing said image and having a plurality of transparent discrete areas of elemental size, and a lens system for dividing said image into elemental areas and projecting them individually through said transparent areas, said lens system being located between said screen and said image.

2. An optical system for projecting an image comprising means for focusing said image in a plane, a black viewing screen arranged for viewing said image and having a plurality of transparent discrete areas of elemental size, and a lens system for projecting elemental areas of said image individually through said transparent areas, said lens system being located between said screen and said image and comprising a first and a second set of parallel equidistant cylindrical lenses, said two sets of lenses being arranged at right angles to each other.

3. An optical system for projecting an image comprising means for focusing said image in a plane, an opaque viewing screen arranged for viewing said image and having a plurality of transparent portions, and a lens system for projecting elemental areas of said image individually through said portions, said lens system being located between said screen and said image and comprising a transparent optical medium having a first surface facing said image and provided with a first series of parallel grooves arranged to form a first set of cylindrical lenses and an opposite second surface facing said screen and provided with a second series of parallel grooves arranged at right angles to said first series of grooves to form a second set of cylindrical lenses, said first set of lenses having a radius of curvature $R_1$, said second set of lenses having a radius of curvature $R_2$, $R_1$ and $R_2$ being determined by the equation $$\frac{R_1}{R_2}=\frac{a}{c}\,\frac{b+nc}{b+na}$$

where $n$ is the refractive index of said medium, $a$ is the shortest distance between said plane and said first surface, $a$ being taken positive when said plane is between said image and said first surface and $a$ being taken negative when said plane is beyond said first surface as seen from said image, $b$ is the distance between said two surfaces, and $c$ is the shortest distance between said second surface and said screen.

4. A television image projecting system comprising means for developing a television image, means for projecting and focusing said image in a plane, a black viewing screen having transparent discrete areas of elemental size, and a bicylindrical lens array positioned between said screen and said plane, said lens array comprising a first set of horizontal equally spaced convex cylindrical lenses facing said plane and arranged parallel to each other and a second set of vertical equally spaced convex cylindrical lenses facing said screen and arranged parallel to each other, said transparent screen areas being aligned with said lens array in such a manner that elemental areas of said image are projected individually through said transparent screen areas.

5. An optical system for projecting an image comprising means for focusing said image in a plane, a viewing screen for viewing said image, and a lens system comprising a first set of identical cylindrical lenses arranged parallel to each other and a second set of identical cylindrical lenses arranged parallel to each other and at right angles to said first set of lenses, said lens system being located between said screen and said plane, said first set of lenses facing said plane, said second set of lenses facing said screen, the image projected on said screen being visible within a solid cone having an elliptical cross section with a larger axis in a predetermined direction and a shorter axis at right angles to said larger axis, said first set of lenses having their axis parallel to the larger axis of said elliptical cross section, the radius of curvature of said first set of lenses being larger than the radius of curvature of said second set of lenses.

6. An optical system for projecting an image comprising means for focusing said image in a plane, a black viewing screen having a plurality of transparent discrete areas of elemental size, and a lens system for projecting elemental areas of said image individually through said transparent areas, said lens system comprising a first set of identical cylindrical lenses arranged parallel to each other and a second set of identical cylindrical lenses arranged parallel to each other and at right angles to said first set of lenses, said lens system being located between said screen and said plane, said first set of lenses facing said plane, said second set of lenses facing said screen, the image projected on said screen being visible within a solid cone having an elliptical cross section with a larger axis in a predetermined direction and a shorter axis at right angles to said larger axis, said first set of lenses having their axes parallel to the larger axis of said elliptical cross section, the radius of curvature of said first set of lenses being larger than the radius of curvature of said second set of lenses.

7. A television image projecting system comprising means for developing a television image, means for projecting and focusing said image in a plane, a black viewing screen having a plurality of transparent discrete areas of elemental size, and a lens system for projecting elemental areas of said image individually through said transparent areas, said lens system comprising a first set of horizontal identical equally spaced convex cylindrical lenses arranged parallel to each other and a second set of vertical identical equally spaced convex cylindrical lenses, said lens system being located between said screen and said plane, said first set of lenses facing said plane, said second set of lenses facing said screen, the image projected on said screen being visible within a solid cone having an elliptical cross section with a larger axis in the horizontal direction and a shorter axis in the vertical direction, the radius of curvature of said first set of lenses being larger than the radius of curvature of said second set of lenses.

MADISON CAWEIN.
HANS W. G. SALINGER.

REFERENCES CITED

The following references are of record in the file of this patent:

UNITED STATES PATENTS

| Number | Name | Date |
|---|---|---|
| 2,018,592 | Arnulf | Oct. 22, 1935 |
| 2,028,496 | Chiti | Jan. 21, 1936 |
| 2,131,974 | Saint Genies | Oct. 4, 1938 |
| 2,229,302 | Martin et al. | Jan. 21, 1941 |
| 2,307,210 | Goldsmith | Jan. 5, 1943 |
| 2,338,654 | MacNeille | Jan. 4, 1944 |
| 2,351,294 | Schade | June 13, 1944 |

FOREIGN PATENTS

| Number | Country | Date |
|---|---|---|
| 24,917 | Great Britain | of 1911 |